United States Patent
Tang et al.

(10) Patent No.: US 11,349,545 B2
(45) Date of Patent: May 31, 2022

(54) BEAM MANAGEMENT WITHOUT BEAM CORRESPONDENCE

(71) Applicant: Apple Inc., Cupertino, CA (US)

(72) Inventors: Jia Tang, San Jose, CA (US); Sami M. Almalfouh, San Jose, CA (US); Haitong Sun, Irvine, CA (US); Zhu Ji, San Jose, CA (US); Wei Zeng, San Diego, CA (US); Johnson O. Sebeni, Fremont, CA (US); Wei Zhang, Santa Clara, CA (US); Beibei Wang, Cupertino, CA (US); Dawei Zhang, Saratoga, CA (US); Pengkai Zhao, San Jose, CA (US)

(73) Assignee: Apple Inc., Cupertino, CA (US)

( * ) Notice: Subject to any disclaimer, the term of this patent is extended or adjusted under 35 U.S.C. 154(b) by 194 days.

(21) Appl. No.: 16/585,652

(22) Filed: Sep. 27, 2019

(65) Prior Publication Data
US 2020/0145080 A1    May 7, 2020

Related U.S. Application Data

(60) Provisional application No. 62/755,976, filed on Nov. 5, 2018, provisional application No. 62/755,198, filed on Nov. 2, 2018.

(51) Int. Cl.
*H04B 7/06*        (2006.01)
*H04B 7/08*        (2006.01)
(Continued)

(52) U.S. Cl.
CPC ......... *H04B 7/0695* (2013.01); *H04B 7/0617* (2013.01); *H04B 7/088* (2013.01); *H04W 24/10* (2013.01); *H04W 52/0235* (2013.01)

(58) Field of Classification Search
CPC .... H04B 7/0617; H04B 7/0695; H04B 7/088; H04W 24/10; H04W 52/0235; H04W 72/046
See application file for complete search history.

(56) References Cited

U.S. PATENT DOCUMENTS

| 8,880,000 | B1 | 11/2014 | Zhou |
| 2013/0223251 | A1 | 8/2013 | Li et al. |

(Continued)

FOREIGN PATENT DOCUMENTS

| WO | 2012086472 A1 | 6/2012 |
| WO | 2016/179804 | 11/2016 |

(Continued)

OTHER PUBLICATIONS

Extended European Search Report, Application No. 19206502.7, dated Apr. 29, 2020, 13 pages.

(Continued)

*Primary Examiner* — Khaled M Kassim
(74) *Attorney, Agent, or Firm* — Kowert, Hood, Munyon, Rankin & Goetzel, P.C.

(57) ABSTRACT

Apparatuses, systems, and methods for a wireless device to perform beam management procedures with a base station. A wireless device in communication with a 5G base station may perform measurements and determine constraints relevant to beam selection. The device may select a recommended beam based on the measurements and constraint(s) and indicate the recommended beam to the base station. A recommended uplink beam may not correspond to a recommended downlink beam.

20 Claims, 12 Drawing Sheets

(51) Int. Cl.
*H04W 24/10* (2009.01)
*H04W 52/02* (2009.01)

(56) References Cited

U.S. PATENT DOCUMENTS

| | | | |
|---|---|---|---|
| 2015/0236772 A1* | 8/2015 | Hammarwall | H04B 7/0617 |
| | | | 370/329 |
| 2017/0237535 A1 | 8/2017 | Park | |
| 2018/0131434 A1 | 5/2018 | Islam et al. | |
| 2018/0227094 A1 | 8/2018 | Liu | |
| 2018/0279239 A1 | 9/2018 | Si | |
| 2018/0279318 A1 | 9/2018 | Wang | |
| 2018/0367374 A1 | 12/2018 | Liu | |
| 2019/0045542 A1 | 2/2019 | Yang | |
| 2019/0052344 A1 | 2/2019 | Kundargi | |
| 2019/0075014 A1 | 3/2019 | Zhou | |
| 2019/0132098 A1 | 5/2019 | Wernersson | |
| 2019/0215039 A1* | 7/2019 | Gao | H04B 7/0617 |
| 2019/0239233 A1 | 8/2019 | Ryu | |
| 2019/0305830 A1* | 10/2019 | Zhou | H04W 74/0833 |
| 2020/0022093 A1* | 1/2020 | Han | H04W 72/046 |
| 2020/0059283 A1* | 2/2020 | Venugopal | H04W 72/046 |
| 2020/0112926 A1* | 4/2020 | Laghate | H04B 7/0404 |
| 2020/0374818 A1* | 11/2020 | Cai | H04W 52/367 |
| 2020/0413409 A1* | 12/2020 | Zhou | H04W 72/0413 |
| 2021/0167837 A1* | 6/2021 | Gro Mann | H04B 7/0628 |

FOREIGN PATENT DOCUMENTS

| | | |
|---|---|---|
| WO | 2017196612 A1 | 11/2017 |
| WO | 2018/083253 | 5/2018 |
| WO | 2018127558 A1 | 7/2018 |
| WO | 2018/145313 | 8/2018 |

OTHER PUBLICATIONS

Nokia, Nokia Shanghai Bell; "Enhancements on Multi-beam Operation [online]"; 3GPP TSG RAN WG1 #94b R1-1811408, Internet: (Sep. 29, 2018); 15 pages.

Office Action for KR Patent Application No. 10-2019-0138412; dated Apr. 5, 2021; 11 pages.

Nokia et al. "Decoupling DL and UL beam selection"; 3GPP TSG RAN WG1 #93 R1-1807189; Busan, Korea; Apr. 21-25, 2018, 2 pages.

NTT Docomo "Further Views on NR Beam Management"; 3GPP TSG RAN WG1 #90bis R1-1718192; Prague, CZ, Oct. 9-13, 2017; 11 pages.

Intel Corporation "On beam management with beam correspondence and emission safety"; 3GPP TSG RAN WG1 #92 R1-1802567; Athens, Greece; Feb. 26-Mar. 2, 2018, 2 pages.

Qualcomm Incorporated "Definition of UE beam correspondence requirement for FR2" 3GPP TSG RAN WG4 #86bis R4-1804661; Melbourne, AU; Apr. 16-20, 2018; 4 pages.

Office Action for Japanese Patent Application No. 2019-196267, dated Jul. 5, 2021.

Xiaomi "Enhancements on beam management", 3GPP TSG RAN WG1 Meeting #94bis, R1-1811393, Chengdu, China, Oct. 8-12, 2018, 5 pages.

Apple "Considerations on separate DL and UL beam reporting", 3GPPP TSG RAN WG1 Meeting #95, Spokane, USA, Nov. 12-16, 2018, 3 pages.

Preliminary Rejection for KR Patent Application No. 10-2019-0138412; dated Oct. 15, 2021.

Apple Inc. "Discussion on beam measurement and reporting"; 3GPP TSG RAN WG1 Meeting #92 R1-180228; Athens, Greece; Feb. 26-Mar. 2, 2018.

* cited by examiner

FIG. 17

| P3 CSI Report | CSI Fields |
|---|---|
| CSI Report # | RSRP, PHR, path loss etc |

FIG. 18

| P2 CSI Report | CSI Fields | |
|---|---|---|
| CSI Report # | SSBRI/CRI #1 | |
| | SSBRI/CRI #2 | For UL (1802) |
| | RSRP #1 | |
| | RSRP #1 | |

FIG. 19

| | CSI Fields | | |
|---|---|---|---|
| CSI Report for DL BM | SSBRI/CRI #n0 | RSRP n0 | Implicit Rank 1 |
| | SSBRI/CRI #n1 | RSRP n1 | Implicit Rank 2 |
| | SSBRI/CRI #n2 | RSRP n2 | Implicit Rank 3 |
| | SSBRI/CRI #n3 | RSRP n3 | Implicit Rank 4 |

FIG. 20

| CSI Report for UL BM | CSI Fields | | |
|---|---|---|---|
| | SSBRI/CRI #k0 | RSRP k0 | Implicit Rank 1 |
| | SSBRI/CRI #k1 | RSRP k1 | Implicit Rank 2 |
| | SSBRI/CRI #k2 | RSRP k2 | Implicit Rank 3 |
| | SSBRI/CRI #k3 | RSRP k3 | Implicit Rank 4 |

FIG. 21

| CSI Report | CSI Fields | | | |
|---|---|---|---|---|
| | SSBRI/CRI #n0 | RSRP n0 | Tx Power Back off n0 | Implicit Rank 1 |
| | SSBRI/CRI #n1 | RSRP n1 | Tx Power Back off n1 | Implicit Rank 2 |
| | SSBRI/CRI #n2 | RSRP n2 | Tx Power Back off n2 | Implicit Rank 3 |
| | SSBRI/CRI #n3 | RSRP n3 | Tx Power Back off n3 | Implicit Rank 4 |

FIG. 22

| CSI Report | CSI Fields | | | |
|---|---|---|---|---|
| | SSBRI/CRI #n0 | RSRP n0 | PHR n0 | Implicit Rank 1 |
| | SSBRI/CRI #n1 | RSRP n1 | PHR n1 | Implicit Rank 2 |
| | SSBRI/CRI #n2 | RSRP n2 | PHR n2 | Implicit Rank 3 |
| | SSBRI/CRI #n3 | RSRP n3 | PHR n3 | Implicit Rank 4 |

BEAM MANAGEMENT WITHOUT BEAM CORRESPONDENCE

PRIORITY CLAIM

This application claims priority to U.S. provisional patent application Ser. No. 62/755,198, entitled "Beam Management without Beam Correspondence," filed Nov. 2, 2018 and to U.S. provisional patent application Ser. No. 62/755,976, entitled "Beam Management without Beam Correspondence," filed Nov. 5, 2018, each of which is hereby incorporated by reference in its entirety as though fully and completely set forth herein.

FIELD

The present application relates to wireless devices, and more particularly to apparatus, systems, and methods for a wireless device to perform beam management procedures for next generation radio access technologies.

DESCRIPTION OF THE RELATED ART

Wireless communication systems are rapidly growing in usage. Further, wireless communication technology has evolved from voice-only communications to also include the transmission of data, such as Internet and multimedia content. Beam management may be an important procedure, e.g., in millimeter wave New Radio (NR). In practice, preferred uplink and downlink beams may not be the same. Thus, improvements in the field are desired.

SUMMARY

Embodiments relate to apparatuses, systems, and methods to perform beam management procedures of a wireless device and a next generation network node (e.g., a fifth generation new radio (5G NR) network node also called a gNB). A wireless device may establish communication with the gNB. The wireless device may perform measurements and/or determine constraints relevant to beam selection. The device may request and perform a beam management procedure with the gNB and may perform measurements as a part of the beam management procedure. The device may select a recommended beam based on the measurements and constraint(s) and indicate the recommended beam to the base station. A recommended uplink beam may not correspond to a recommended downlink beam, e.g., the downlink beam and uplink beam may not correspond.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIGS. 17-22 illustrate exemplary reporting techniques, according to some embodiments.

Figure 1:
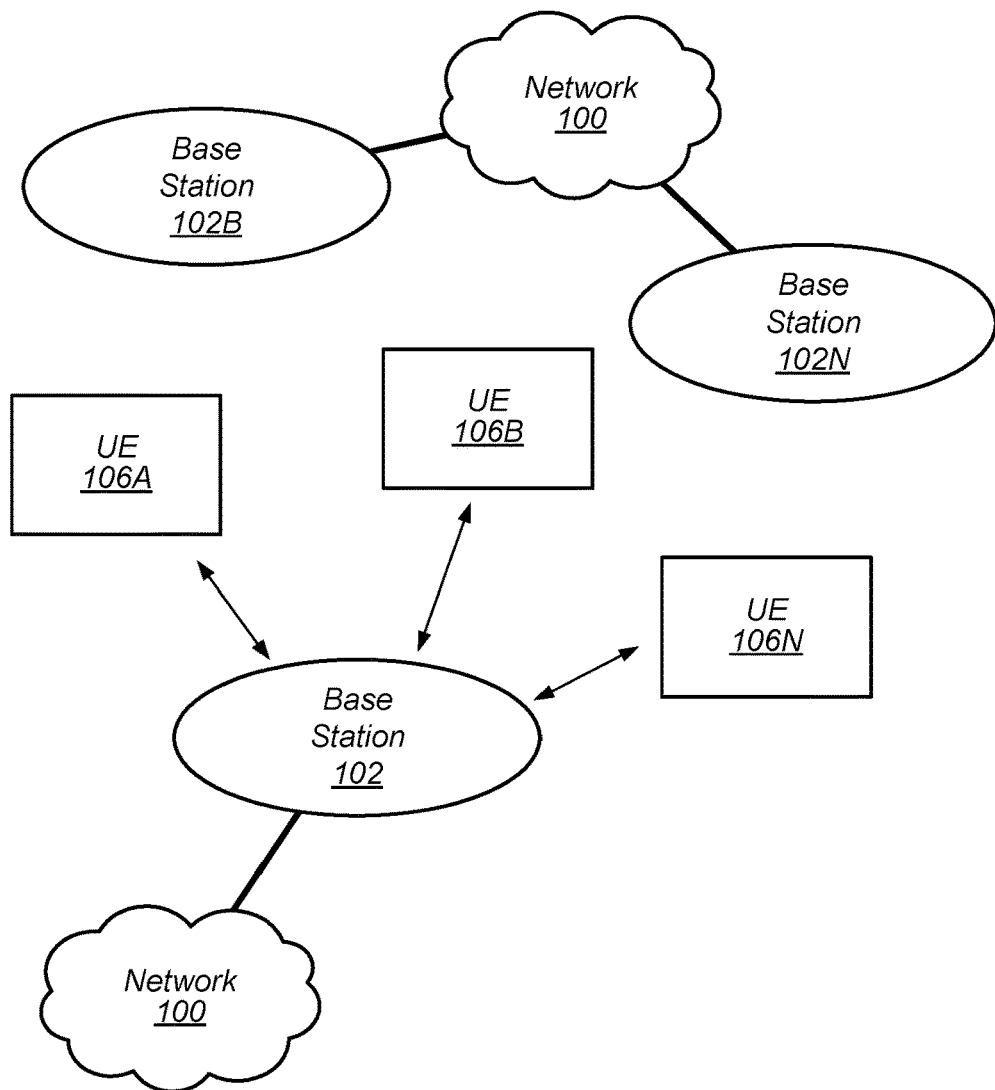
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, Play Station Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

ACRONYMS

BM: beam management
QCL: quasi-colocation
DCI: downlink control information
TCI: transmission configuration indicator
CSI: channel state information
RS: reference signal
SSB: Synchronization Signal Blocks
SRS: Sound Reference Signal Resource Set
CRS: CSI-RS Resource Set
CORESET: Control Resource Set FIGS. 1 and 2—Communication System FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102 which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102 may be a base transceiver station (BTS) or cell site (a "cellular base station"), and may include hardware that enables wireless communication with the UEs 106A through 106N.

The communication area (or coverage area) of the base station may be referred to as a "cell." The base station 102 and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102 is implemented in the context of LTE, it may alternately be referred to as an 'eNodeB' or 'eNB'. Note that if the base station 102 is implemented in the context of 5G NR, it may alternately be referred to as 'gNodeB' or 'gNB'.

As shown, the base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. In particular, the cellular base station 102 may provide UEs 106 with various telecommunication capabilities, such as voice, SMS and/or data services.

Base station 102 and other similar base stations operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102 may act as a "serving cell" for UEs 106A-N as illustrated in FIG. 1, each UE 106 may also be capable of receiving signals from (and possibly within communication range of) one or more other cells (which might be provided by other base stations 102B-N), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. Other configurations are also possible.

In some embodiments, base station 102 may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

Figure 2:
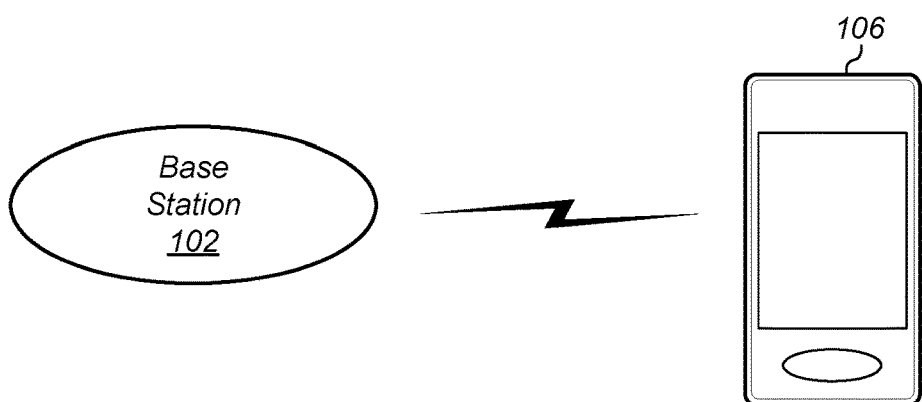
FIG. 2 illustrates a base station (BS) in communication with a user equipment (UE) device, according to some embodiments.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for multiple-input, multiple-output or "MIMO") for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include any number of antennas and may be configured to use the antennas to transmit and/or receive directional wireless signals (e.g., beams). The antennas of the UE 106 may be grouped into one or more antenna arrays and/or panels. The UE 106 may be configured to transmit and/or receive with any number of beams simultaneously. In other words, the UE may be multi-beam capable. For example, a UE's panel may have the capability to generate multiple Rx beams concurrently (e.g., from horizontal polarized antenna group and vertical polarized antenna group of the panel). In this case, the UE may be able to measure two beams concurrently.

Similarly, the BS 102 may also include any number of antennas and may be configured to use the antennas to transmit and/or receive directional wireless signals (e.g., beams). The antennas of the BS 102 may be grouped into one or more antenna arrays and/or panels. The BS 102 may also be multi-beam capable.

In some embodiments, the UE 106 and/or BS 102 may be configured for beam non-correspondence. Beam non-correspondence may refer to using different beams for uplink and downlink communications (e.g., a device may use a first beam for uplink and a second beam for downlink, in other words one beam for transmission and a different beam for reception). In beam non-correspondence scenarios either or both of the UE 106 and/or BS 102 may use different beams.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTTor LTE or GSM), and separate radios for communicating using each of Wi-Fi and Bluetooth. Other configurations are also possible.

Figure 3:
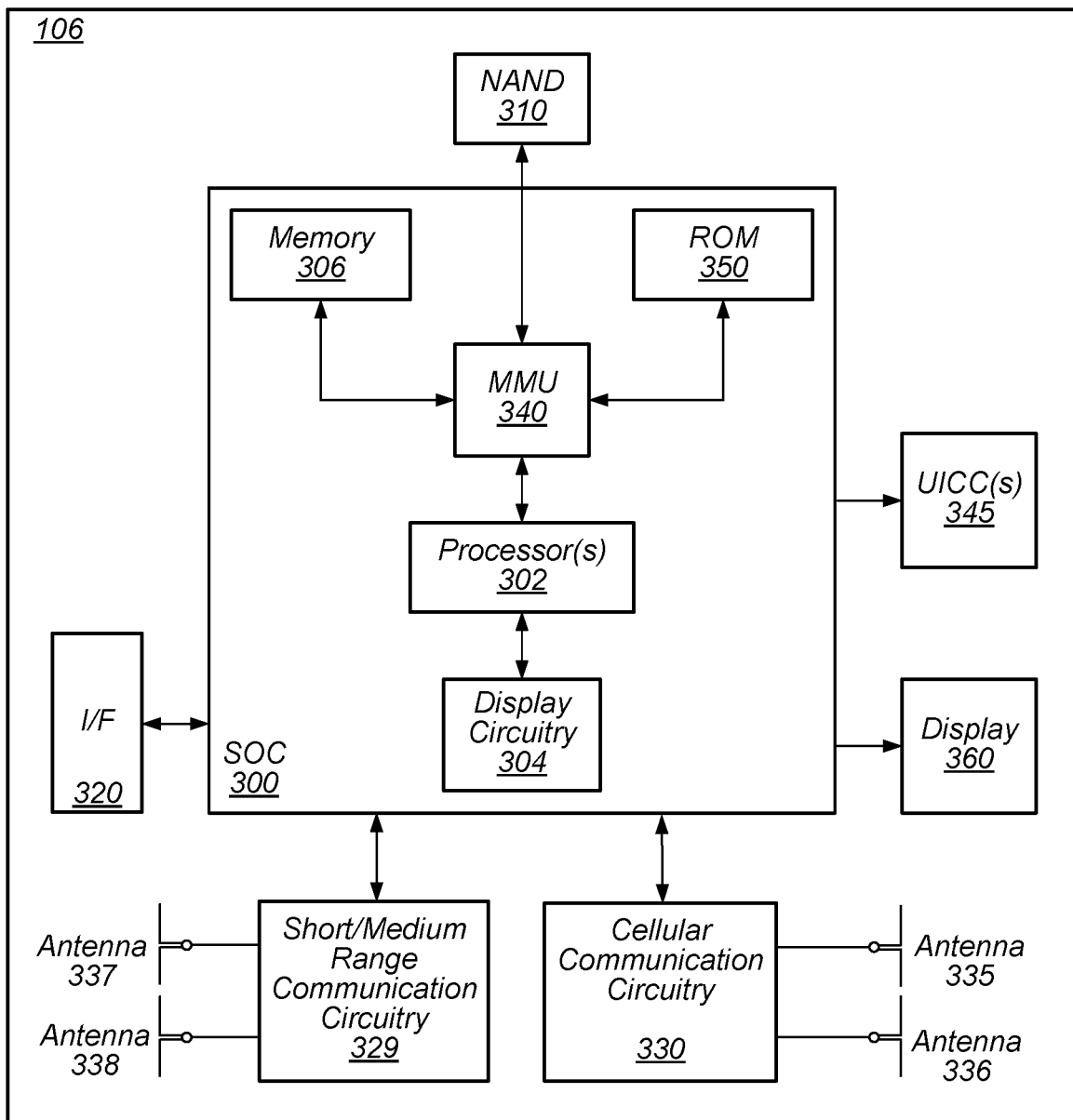
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity with the first and second network nodes has been established.

As described herein, the communication device 106 may include hardware and software components for implementing features for using RRC multiplexing to perform transmissions according to multiple radio access technologies in the same frequency carrier, as well as the various other techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
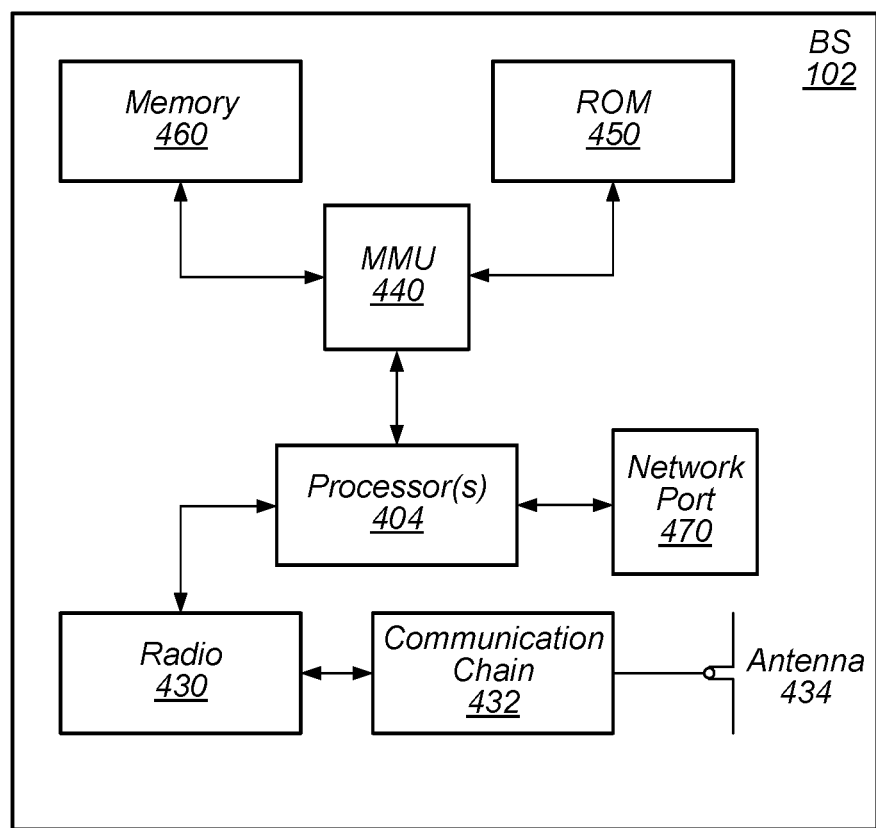
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs).

In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
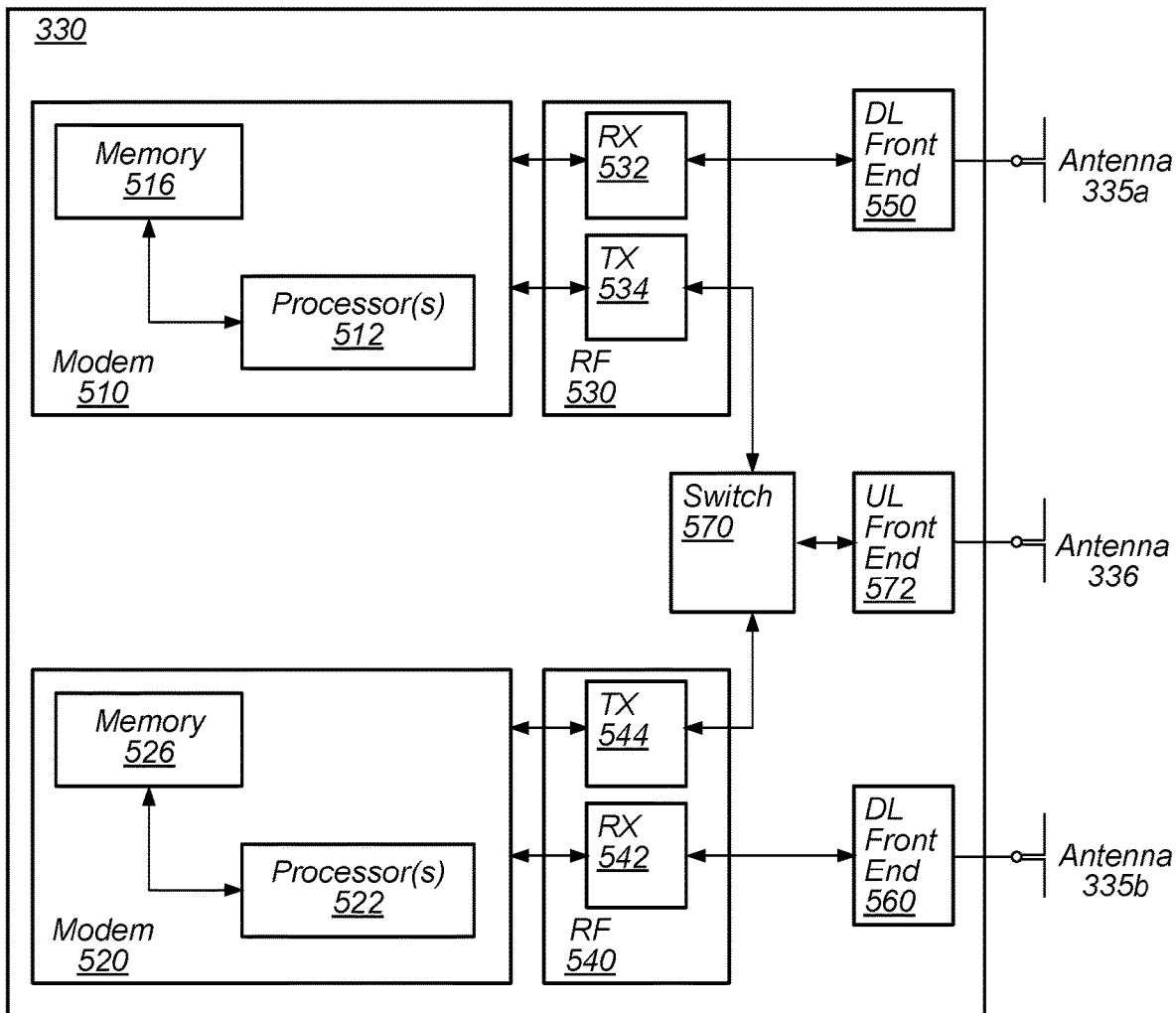
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, are also possible. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to transmit, via the first modem while the switch is in the first state, a request to attach to a first network node operating according to the first RAT and transmit, via the first modem while the switch is in a first state, an indication that the wireless device is capable of maintaining substantially concurrent connections with the first network node and a second network node that operates according to the second RAT. The wireless device may also be configured transmit, via the second radio while the switch is in a second state, a request to attach to the second network node. The request may include an indication that the wireless device is capable of maintaining substantially concurrent connections with the first and second network nodes. Further, the wireless device may be configured to receive, via the first radio, an indication that dual connectivity with the first and second network nodes has been established.

As described herein, the modem 510 may include hardware and software components for implementing features for using RRC multiplexing to perform transmissions according to multiple radio access technologies in the same frequency carrier, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing features for using RRC multiplexing to perform transmissions according to multiple radio access technologies in the same frequency carrier, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Figure 6:
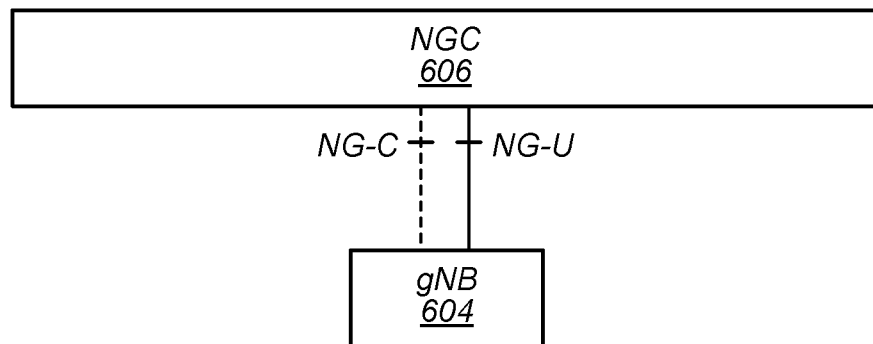
FIGS. 6 and 7 illustrate examples of a 5G NR base station (gNB), according to some embodiments.
Figure 7:
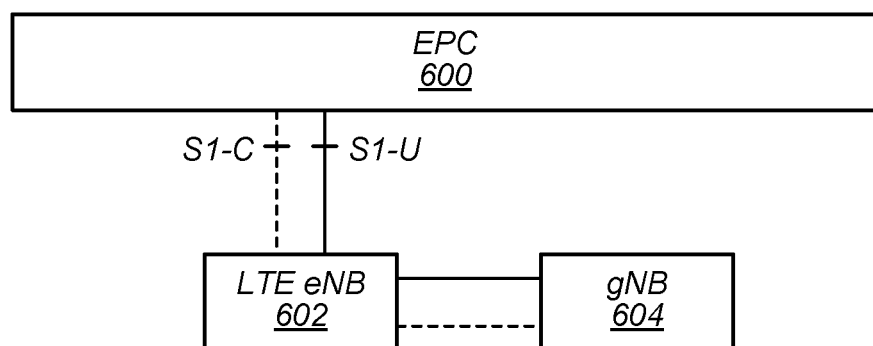

FIGS. 6-7—5G NR Architecture

In some implementations, fifth generation (5G) wireless communication will initially be deployed concurrently with other wireless communication standards (e.g., LTE). For example, whereas FIG. 6 illustrates a possible standalone (SA) implementation of a next generation core (NGC) network 606 and 5G NR base station (e.g., gNB 604), dual connectivity between LTE and 5G new radio (5G NR or NR), such as in accordance with the exemplary non-standalone (NSA) architecture illustrated in FIG. 7, has been specified as part of the initial deployment of NR. Thus, as illustrated in FIG. 7, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. In some instances, the gNB 604 may also have at least a user plane reference point with EPC network 600. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services. As will be appreciated, numerous other non-standalone architecture variants are possible.

Figure 8:
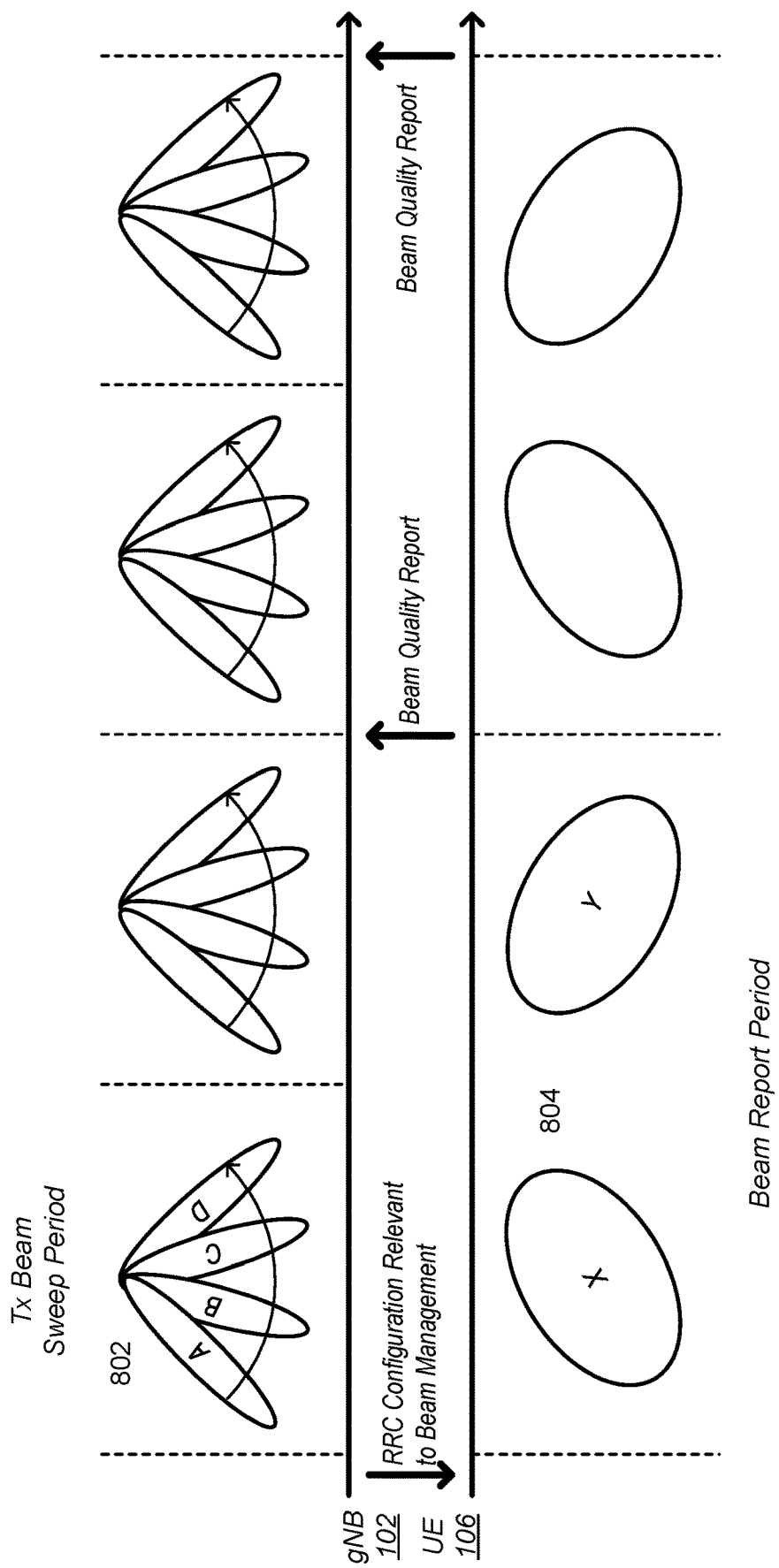
FIG. 8 illustrates beam management procedures, according to some embodiments.
Figure 9:
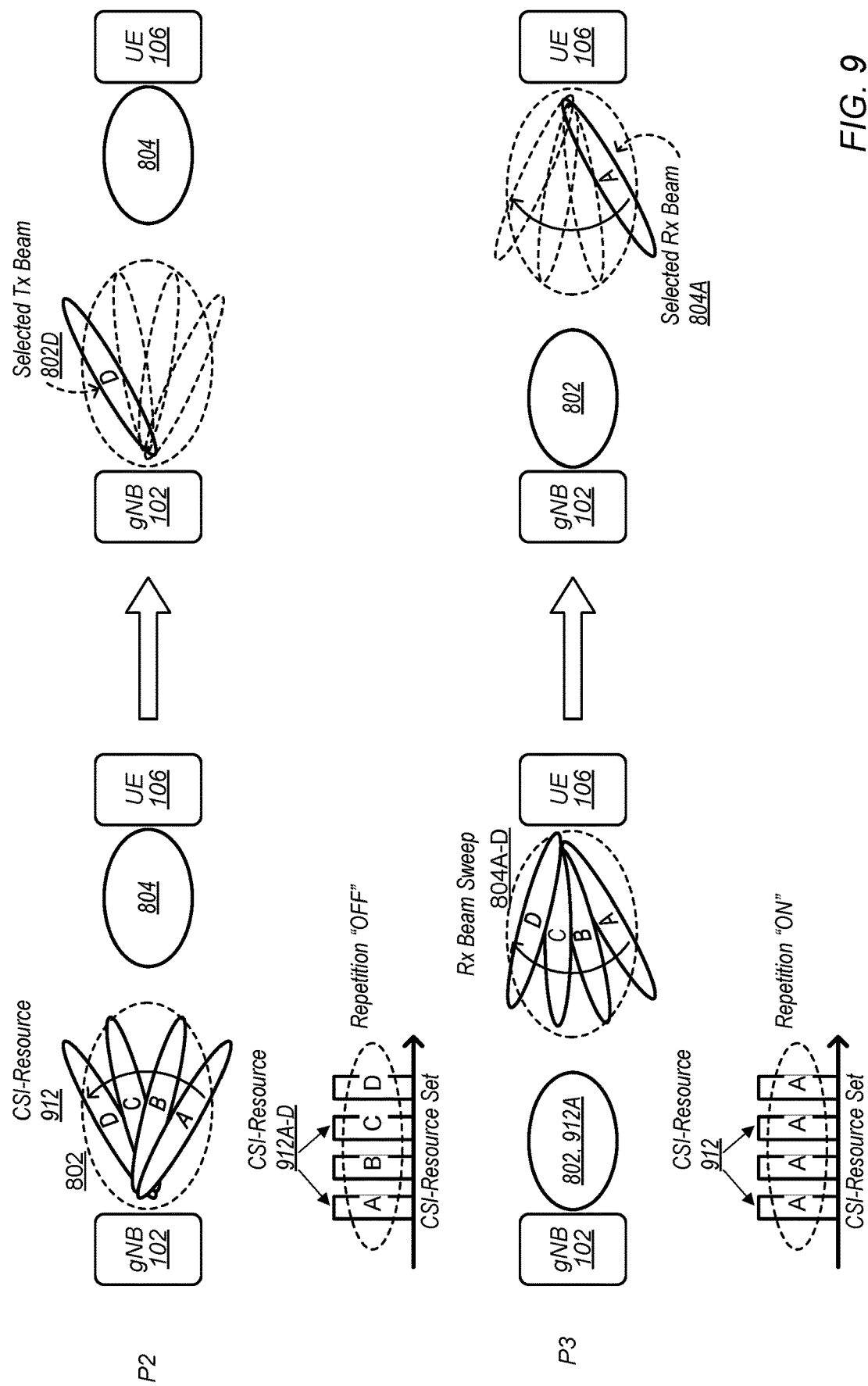
FIG. 9 illustrates beam management procedures P2 and P3, according to some embodiments.

FIGS. 8 and 9—Beam Management (BM)

One aspect of 5G may be beam forming and beam management (BM). Beam forming and beam management may include various techniques for creating directional beams for transmitting (Tx) and receiving (Rx) wireless signals. A wireless device (e.g., UE 106 and/or BS 102) may use multiple antennas to create such beams. In order to create a communication channel between a pair of wireless devices, the devices may select respective Tx and Rx beams so that the transmitting device's Tx beam points toward (e.g., aligns with) the receiving device's Rx beam. BM may be thought of as the process to select beams and maintain appropriate Tx and Rx beam selection to create a quality communication channel (e.g., as measured according to one or more of various metrics of signal strength and quality such as RSRP, RSRQ, SINR, SNR, CQI, etc.). Various factors of the communication environment may impact beam selection, e.g., position and orientation of the devices relative to obstacles (e.g., buildings), sources of interference, etc. These factors may change over time (e.g., due to motion of the UE, among other reasons) and thus the preferred Rx and or Tx beams may also change. Note that both devices may both transmit and receive, and thus the devices may use both Tx and Rx beams.

BM frameworks may operate as shown in FIG. 8. A BS 102 (e.g., a gNB 102, e.g., shown as the transmitting device, in this example, but note that the roles may be reversed) may periodically or routinely transmit BM channel state information (CSI). BM CSI may include reference signals (e.g., Periodic CSI-RS (P-CSI-RS), Semi-persistent CSI-RS (SP-CSI-RS), Synchronization Signal Blocks (SSB), etc.). The gNB may also periodically transmit RRC configuration information that may be relevant to BM. The UE may monitor/measure the RSRP (and/or other metric(s) of signal strength and/or quality) of the beam(s) and may report the RSRP (e.g., metric(s)) to the gNB (e.g., in a beam quality report). The gNB may monitor beam degradation (e.g., or any change in beam quality), e.g., based on the reported RSRP. Note that additional or alternative measurements may also be taken, reported and used such as RSRQ, SNR, etc. Based on detecting beam degradation (e.g., due to CSI and/or one or more metrics in the beam quality report passing or falling below a threshold), the gNB may trigger BM procedures. In some embodiments, aperiodic BM procedures (such as P2/P3, discussed below) may be triggered by a gNB if BM CSI is not sufficient to avoid degradation (e.g., beyond a threshold). Such aperiodic BM procedures may be UE-specific, e.g., in order to avoid the potentially extensive resource cost of doing so for UEs generally.

As illustrated, during an exemplary BM procedure, a BS 102 (e.g., a gNB) may transmit a series of beams (e.g., Tx beams 802A, B, C, and D) in a sweep (or a series of sweeps) and may transmit RRC configuration information relevant to beam management. As used herein, the term "sweep" may indicate sequentially using each of multiple beams. UE 106 may detect one or more of the beams, may measure the strength (e.g., RSRP) or other characteristics of the beam(s), and may provide one or more reports to the gNB based on the detection(s) and/or measurement(s). During the sweep, the UE may use one or more Rx beams (in the illustrated example, the UE uses two different Rx beams 804X and Y). One or more beam sweep periods (e.g., the length of time to transmit Tx beams 802A-D) may occur during a beam report period (e.g., the length of time until a beam quality report is created and transmitted). In the illustrated example, two beam sweep periods occur during the beam report period. In each of the exemplary beam sweep periods, the gNB performs a complete sweep while the UE uses a single Rx beam; the UE sequentially sweeps through various Rx beams for the different Tx beam sweep periods.

FIG. 9 illustrates exemplary BM procedures referred to as P2 and P3. P2 and P3 may be used to select beams for downlink communications. For example, P2 may be used to select transmission beams (e.g., holding the reception beam(s) constant or omnidirectional) and P3 may be used to select reception beams (e.g., holding the transmission beam(s) constant or omnidirectional). P2 and P3 may be on-demand procedures and rely on aperiodic CSI-RS. For example, upon beam degradation (e.g., beam quality metrics falling below a threshold), one or more of P2 or P3 may be used to select new or better transmission and/or reception beams. In some embodiments, P2 and or P3 may follow P1, which may be a longer more intensive procedure, e.g., used initially for determining both transmission and reception beams.

In P2, a BS 102 transmits a series (e.g., a sweep) of Tx beams 802A-D, e.g., narrow beams at different angles using a set of CSI resources 912A-D (CSI resource set or CRS). Note that although four Tx beams are shown, any number of beams (e.g., and corresponding CSI resources) may be used in the sweeping pattern. A specific CSI resource may correspond to each beam, resulting in the total group of beams using a specific CRS. For example, a CRS consisting of four resources may be used for P2, such that a different resource is used for each of four beams. More specifically, Tx beam 802A may use CSI-Resource 912A and so forth. In other words, the CRS may not be repeated, e.g., repetition is off. In the example shown, a receiving UE 106 may use a single, broad receive (e.g., Rx beam 804, which may be an omnidirectional beam) beam during the sweep. Based on reports provided by the UE, the gNB may select a Tx beam. The gNB may then use the selected Tx beam (e.g., 802D) for communication with the UE.

In the exemplary P3 procedure of FIG. 9, in contrast to P2, the UE 106 may perform a sweep of Rx beams 804A-D while the gNB transmits a constant, broad Tx beam 802 (e.g., an omnidirectional beam). In this example, the gNB may use a single CSI resource (e.g., shown as 912A, noting that any CSI resource may be used) during the sweep, e.g., repetition may be on. Thus, in this exemplary embodiment, the CRS may only include a single resource, e.g. CSI-Resource 912A. Based on the measurements (e.g., RSRP) of the Tx beam using the different Rx beams, the UE may select an Rx beam. The UE may report the selected Rx beam (e.g., 804A) to the gNB, although Rx beam selection reporting may not be necessary. The UE may use the selected Rx beam for receiving communications from the gNB.

It will be appreciated that other BM procedures are possible, including at least P1, U1, U2, and U3. As noted above, P1 may include concurrent and/or sequential sweeps of both the gNB (e.g., Tx beam) and UE (e.g., Rx). U1, U2, and U3 may correspond to the P1, P2, and P3 procedures, respectively, except in the uplink direction where the roles may be reversed, e.g., the UE may transmit a Tx beam and the gNB may receive with an Rx beam. Thus, in U2, for example, the UE may sweep across multiple transmission beams and in U3, the gNB may sweep across multiple reception beams. Thus, in some embodiments, procedures P1, P2, and P3 may be associated with downlink transmissions and U1, U2, and U3 may be associated with uplink transmissions.

Further, the gNB may be configured to periodically transmit synchronization signal blocks (SSB). SSB may be transmitted using different beams at different times, and the different Tx beams may use different SSB indexes (e.g., the SSB index may be mapped to the beams). Thus, the UE may be able to use the SSB transmissions to perform measurements (e.g., measuring reception with one or more Rx beams for one or more of the gNB's Tx beams).

Figure 10:
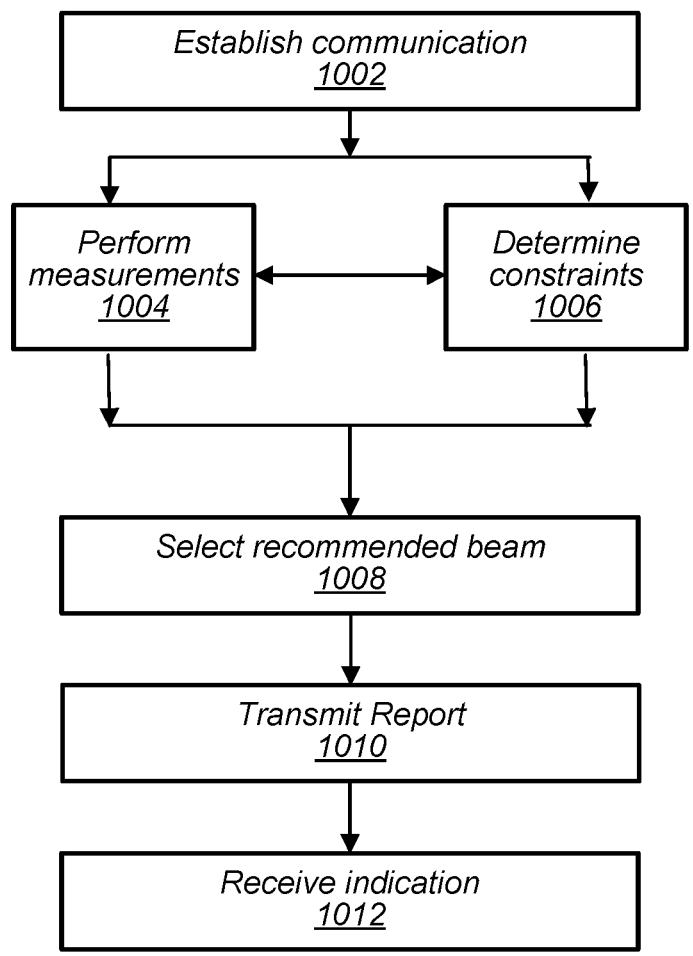
FIG. 10 is a flowchart illustrating techniques for beam management procedures without beam correspondence, according to some embodiments.

FIG. 10—Techniques for Beam Management with Non-Correspondence

Beam management (BM) may be an important procedure in 5G New Radio (NR), e.g., particularly for millimeter wave (mmWave) communications. BM may include beam measurement, beam determination/selection, beam reporting, and beam failure recovery. Current BM procedures may typically assume Tx/Rx correspondence in at least some circumstances (see, 3GPP technical specifications, for instance, e.g., 38.912 Section 8.2.1.6.1). Tx/Rx correspondence may indicate that the beams for uplink (UL) and downlink (DL) are reciprocal, e.g., the optimal Tx/Rx beam pair for UL and DL is the same.

For beam reporting, a UE (e.g., UE 106) may typically report the DL beam (e.g., the BS 102's Tx beam) which may be preferred for UE reception. Based on Tx/Rx correspondence, the same beam may be used for UL, e.g., BS may use the same beam reported by UE for UL reception.

In practice however, the preferred UL and DL beams may not be the same, e.g., they may not correspond. This difference or non-correspondence may be due to UE specific constraints. For example, one or more of the following constraints may lead to non-correspondence:

Maximum Permissible Exposure (MPE)—due to human safety reasons, a UE Tx beam may not be allowed to point to certain direction(s), or the maximum Tx power may be limited below certain threshold, e.g., in at least some directions. Thus, some Tx beams may be restricted, e.g., in Tx power.

Co-existence interference—due to UE size limitations, a tightly packed UE device may need to support multiple radio technologies, e.g., 2G, 3G, 4G, 5G, WLAN (Wi-Fi), Bluetooth, etc. Wireless signals from different technologies may interfere with each other, which may impose additional constraints on (1) Tx power, (2) Tx beam direction, and/or (3) use of antennas or panels for Tx (in case of a multi-panel UE). For example, if some shared resources (e.g., antennas and/or wireless circuitry) are in use by another RAT, the UE may have relatively limited choices for Tx beams and/or limitations on Tx power using at least some beams. In other words, co-existence interference may present constraints on the hardware and/or software of a UE, which may impact or limit which beams can be used at any given time. For example, co-existence interference avoidance may limit the transmit power used for some beams while other beams may not be constrained in the same way.

UE power saving—A UE may prefer to use a different UL beam (e.g., a wider beam using fewer antenna elements) to transmit, e.g., in order to achieve a desired tradeoff between power and performance.

The UE may obtain information about these constraints (e.g., periodically or as-needed, etc.) from one or more of various components, e.g., an application processor, proximity sensor, co-existence management module, communication circuitry, etc.

Due to these constraints, the UE may be able to determine preferred DL Rx beams and UL Tx beams separately, e.g., considering both DL channel quality and UE specific constraints. DL channel quality may be determined based on any of various measurements. The measurements may include any radio link measurements such as signal-noise ratio (SNR), signal to interference and noise ratio (SINR), reference signal received power (RSRP), reference signal received quality (RSRQ), received signal strength indicator (RSSI), channel quality indicator (CQI), channel state information (CSI), block error rate (BLER), bit error rate (BER), path loss, throughput, etc. The UE may further consider UL channel quality, e.g., based on reports from the BS or other devices.

FIG. 10 illustrates possible beam management enhancements to support cases in which Tx/RX beam correspondence does not hold. In other words, FIG. 10 describes methods of beam management without beam correspondence, e.g., with beam non-correspondence. It will be appreciated that operation according to techniques of FIG. 10 does not imply that the UL/DL beams (e.g., Tx/Rx beams) will not correspond at all times. Instead, FIG. 10 addresses circumstances in which benefits of non-correspondence may be realized. The techniques of FIG. 10 may result in a selection of corresponding beams under some circumstances and non-corresponding beams in other circumstances.

Aspects of the method of FIG. 10 may be implemented by a wireless device, such as the UEs 106 and/or BS 102 illustrated in and described with respect to FIGS. 1-9, or more generally in conjunction with any of the computer systems or devices shown in the above Figures, among other devices, as desired. For example, either or both of UE 106 and/or BS 102 may include processors or other processing elements (e.g., 302, 404, 512, 522, or other processors or processing elements associated with the devices (e.g., as may be included in circuitry 330, etc.) which may be configured to cause the device(s) to perform any or all of the illustrated and/or described method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

A UE 106 may establish communication with a BS 102 (1002). The UE and the BS may communicate using one or more radio access technologies, e.g., NR, etc. The UE and BS may exchange application and/or control data in the uplink and/or downlink directions. The UE and BS may use any combination of UL and DL beams. The communication may occur on any frequency or combination of frequencies, e.g., including licensed and/or unlicensed spectrum.

The UE 106 and/or BS 102 may perform measurements (1004). The measurements may include any radio link measurement(s), e.g., of signal strength or other channel quality metrics. For example, the UE may measure, using one or more Rx beams, the RSRP (and/or other types of measurements) of synchronization signal blocks (SSB) transmitted by the BS using one or more Tx beams.

In some embodiments, the UE may compare the RSRPs of different Rx beams, e.g., during a P1 or P3 procedure, or based on SSB, among various possibilities. The UE may calculate differences between the RSRPs and compare the differences to a threshold of signal strength and/or quality (e.g., an RSRP delta threshold). Such a threshold may be configured by the BS, e.g., as part of an RRC configuration message, among various possibilities. The BS/network may set such a threshold based on various factors such as capability of the BS to receive signals from the UE, measured values of signal strength, etc. For example, such a threshold may be 5 dB, among various possibilities.

In some embodiments, the measurements may include one or more beam selection procedures (e.g., P3). Note that although this example is described in terms of P3, other selection procedures may also/alternatively be used, e.g., P1, P2, U1, U2, or U3, etc. Further, such procedures may be modified or customized as desired.

Such a selection procedure may be initiated at the request of the UE, or may be scheduled by the BS. For example, the UE may identify a set (e.g., a short list) of candidate gNB Tx beams, e.g., based on past measurements performed by the UE based on SSB, P1, etc.; knowledge of the UE constraints (see 1006); information received from the BS; etc. The UE may indicate (e.g., request) to the BS to perform P3 using the set of candidate Tx beams. The UE may transmit such an indication using a media access control (MAC) control element and/or physical uplink control channel (PUCCH), among various possibilities. The UE may indicate the set of candidate beams using an index (e.g., CSI Resource Index, CRI).

In response to receiving such an indication from the UE, the BS may determine whether to grant the request, e.g., whether to trigger aperiodic CSI-RS to perform the indicated beam selection procedure (e.g., P3). The BS (e.g., or other network element in coordination with the BS) may determine whether certain trigger conditions for performing the beam selection procedure are met, and may determine whether to grant the request based on the trigger conditions. For example, the network may determine whether the RSRP (e.g., measured by the UE and reported to the BS) is below a threshold. Similarly, the BS may consider other measurements by the UE and/or BS. Such trigger conditions may serve to avoid inefficient use of resources (e.g., for beam selection procedures that are unlikely to improve beam selection, performance, etc.) and/or to avoid potential misuse. The BS may determine to perform the beam selection procedure. In some embodiments, the BS may select a different beam selection procedure than indicated by the UE.

In response to determining to grant the request, the BS may initiate the selected beam selection procedure. For example, (e.g., in P3), the BS may transmit reference signals using the Tx beams indicated by the UE. The reference signals may be the same or different as used for DL data transmission e.g., the CRI may not be the same as in a normal DL transmission. Note that, in other (e.g., conventional P3) procedures, the UE may perform an Rx sweep assuming that the BS is using the same CRI as for DL data transmission (e.g., sending CSI-RS using the same beam as for data). However, in the case of this "special" P3 performed in response to the UE's request, the BS may use the Tx beam or beams requested by the UE to send CSI-RS. The UE may receive the reference signals using one or more Rx beams, e.g., each BS Tx beam may be received with one or more UE Rx beams. The UE may take measurements (e.g., of RSRP) using each combination of (or one or more of) the BS's Tx beam and the UE's Rx beam. In other words, in the example, P3 may be performed multiple times, e.g., once for each Tx beam indicated by the UE. The procedure may be referred to as "special P3", e.g., due to the request from the UE.

Note that the beam selection procedures may be modified or configured in various ways to perform the functions described above. As a second example, the selection procedure may be P2. The UE may similarly indicate a set of Tx beams that it requests the BS to use for the procedure. The UE may, if multi-beam capable, measure each Tx beam using two or more Rx beams concurrently. For example, a UE capable of receiving with 2 beams concurrently may obtain Nx2 measurements (e.g., a measurement matrix) during a sweep of N Tx beams by the BS.

Alternatively, P2 may be performed multiple times, e.g., in order to allow a (e.g., non-multi-beam capable) UE to perform measurements using multiple Rx beams. Further, P2 may be performed with extended time periods, e.g., allowing the UE to perform a (full or partial) sweep of Rx beams for each of the indicated Tx beams. Still further, a P1 may be performed, e.g., in an abbreviated manor, in order to only measure the indicated Tx beams.

In various embodiments, the measurements may continue (e.g., periodically, randomly, as needed, etc.) for any amount of time. For example, the measurements may occur over any number of subframes and/or symbols. The measurements may occur based on periodic transmissions of reference signals (e.g., SSB) and/or may be scheduled by the BS and/or UE. The measurements may include any radio link measurements such as SNR, SINR, RSRP, RSRQ, RSSI, CQI, CSI, BLER, BER, path loss, throughput, etc. The UE and/or BS may retain a history of measurement values. The UE/BS may compare the measurement values, or metrics calculated based on the measured values, to one or more thresholds. The UE/BS may use various parameters, e.g., for hysteresis, in such comparisons. The measurements, thresholds, and/or parameters may be configured by the BS (e.g., by the network) and/or by the UE. The UE and/or BS may report measurement values, comparison results, etc. to each other and/or to the network at any time.

The UE 106 may determine one or more constraint(s) (1006). The constraint(s) may pertain to wireless transmission and/or beamforming, etc. In other words, the constraint(s) may relate to parameters such as transmission direction and/or transmission power, etc. For example, the UE may determine constraints based on MPE, co-existence interference, and/or power saving. In other words, the UE may determine that one or more Tx beams may not be used, and/or may determine that one or more Tx beams may only be used at or below certain power levels. For example, the UE may determine that for a first beam (e.g., which may be have a highest RSRP in the measurements of 1004), MPE and/or co-existence may limit the transmit power useable for the first beam. For example, the UE may determine that a user's head is or may be in the path of the first beam, and therefore it may be desirable to avoid use of the first beam or use a reduced transmit power for transmissions with the first beam. Similarly, co-existence interference constraints may be determined based on the direction of a beam relative to activity of another radio access technology (RAT) or other wireless circuitry. For example, if a first beam (e.g., selected based on earlier measurements) is in use and new activity of another RAT is detected, it may be desirable to limit the transmit power of the first beam or switch to another beam to avoid co-existence interference with the other RAT (e.g., interfering with activity of the other RAT, or interference from the other RAT).

Similarly, the UE may determine power saving related constraints. For example, the UE may determine its battery level, and based on the battery level (and possibly other factors such as other forecast or current demands for energy), may determine a preference to transmit at or below certain power levels. For purposes of such determinations, the UE may consider factors such as initial (or more generally past) transmission power levels, (e.g., which may have impacted measurements), network parameters (e.g., thresholds such as an RSRP delta threshold, etc.). Note that such power levels may be the same or different than power levels determined based on other constraints (e.g., MPE).

Still further, the UE may determine constraints configured by the network. For example, the UE may determine thresholds (e.g., for measurement values) that may be set by the network to limit or guide the selection of beams.

It will be appreciated that the constraints determined in 1006 and the measurements performed in 1004 may be related. For example, constraints on Tx beams may be used to inform the beams tested in a beam selection procedure. Conversely, the transmission power associated with a tested beam may be used to determine power constraints. Further, the constraints may be determined and the measurements may be performed in any order, e.g., sequentially, iteratively, concurrently, etc.

The UE may select one or more recommended beams from a plurality of potential UL beams and a plurality of potential DL beams (1008). The recommended beam(s) may include one or more of the UL beam (e.g., UE Tx and/or BS Rx) and/or DL beam (e.g., UE Rx and/or BS Tx). The UL beam and DL beam may not correspond, e.g., one or both of the UE and/or BS may use different beams for Tx and Rx.

The recommended beam(s) may be selected based on the measurements and/or constraints. For example, a DL beam may be recommended based on the measurements, e.g., a DL beam that provides the highest RSRP may be recommended. A UL beam, e.g., which may not correspond to the DL beam, may be recommended based on a combination of the measurements and constraints. For example, a UL beam may be selected and recommended from a subset of UL beams with permissible (e.g., in view of constraints, etc.) UE Tx beams based on the measurements. For example, a UL beam with a best RSRP may be selected from a subset of UL beams consistent with the constraints. A UL beam that the UE determines to be likely to provide the best performance, while operating with in any transmit power constraints, may be selected and recommended. For example, if a first beam has the best DL RSRP, but, due to an MPE or co-existence constraint, the first beam is constrained by a transmit power threshold, the UE may estimate the UL performance of the first beam using a transmit power within the transmit power threshold. Based on a comparison of the expected performance of the first beam (within the transmit power threshold) to a second beam (e.g., which may be constrained by a (same or different) transmit power threshold or may be unconstrained), the UE may select one of the first or second beam.

In some embodiments, the UE may recommend a Tx beam for UL that is different than the (e.g., best RSRP) Rx beam for DL, e.g., as long as the difference in RSRP between the two beams is less than a threshold of signal quality and/or strength (e.g., an RSRP delta threshold). Such a recommendation may allow the UE to reduce the power use for transmission, e.g., by recommending a wider beam which may require fewer antennas to transmit.

For example, a first constraint may be a delta threshold and a second constraint may discourage or prohibit use of at least one UL Tx beam (e.g., due to MPE, activity of another RAT, etc.). The UE may perform signal strength measurements for any number of UE Rx beams. The Rx beam with the highest/best signal strength may be recommended for DL. If the second constraint (and any other constraints) do not discourage or prohibit use of the Rx beam with the highest/best signal strength, it may also be recommended for UL. However, if the Rx beam with the highest/best signal strength is discouraged or prohibited by the second constraint, the UE may compare signal strength measurements of the other UE Rx beams to the measurement of the best Rx beam, e.g., using the delta threshold. The UE may recommend, for UL, a beam (e.g., that is not prohibited and/or is less discouraged by the second constraint) that is within the delta threshold of the best signal strength (e.g., signal strength of best beam minus signal strength of recommended beam is less than delta threshold). In some embodiments, the UE may further be configured to select between multiple beams, e.g., that each meet the delta threshold and other constraints, by considering factors such as differences in one or more measurements (e.g., the same or different measurements compared to the delta threshold) and/or relative (e.g., quantified) impacts on other constraints.

In some embodiments, a recommended uplink beam may be determined based on the measurements and/or constraint(s).

In some embodiments, a recommended downlink beam may be determined based on the measurements and/or constraint(s). For example, a DL signal may result in co-existence interference. Thus, a DL beam may be selected and recommended in order to reduce or avoid such interference.

The UE may transmit a report or reports to the BS 102 (1010). The report(s) may indicate the recommended UL and/or DL beam(s) which may or may not correspond to each other. The report may further indicate additional information. For example, the report(s) may include an indication of one or more measurements or factors related to transmission power (e.g., power head room (PHR), power back off).

The report(s) may be transmitted in any of various formats as explained in more detail below with regard to FIGS. 17-22.

In some embodiments, the report(s) may not indicate a recommended beam. The reports may instead indicate measurement results and/or indications of constraints. For example, if no other beam's signal strength is within the delta threshold of a best beam's signal strength, the UE may simply report the measurements.

Based at least in part on the report(s), the BS 102 may select a beam for UL and/or DL, and may transmit an indication of the selected beam(s) to the UE 106 (1012). The UE may receive the indication. The selected beam(s) may or may not be the same as the recommended beam(s) selected by the UE (in 1008) and indicated in the report (1010).

The indication may configure the UE to use an indicated (e.g., selected) Tx beam for UL and/or an indicated Rx beam for DL. The BS and UE may continue to communicate (e.g., control and/or data in UL and/or DL directions) using the selected beams.

In some embodiments, the UE 106 and or BS 102 may detect a change in conditions, e.g., based on measurements or other factors. In response to such a change, the method of FIG. 10 may be re-initiated, e.g., beginning with measurements in 1004 and/or constraints in 1006.

As one example, based on changing activities of other RATs, the UE 106 may determine that constraints, e.g., due to co-existence interference have changed. For example, if another RAT enters an inactive state, previous constraints may be relaxed; conversely, if an inactive RAT becomes active (e.g., or more active) new constraints may be present (e.g., or may become stricter). Based on such a change in constraints, a recommended UL beam may change (e.g., even if measurements do not change). However, it should be noted that additional measurements may be taken, and a new recommended beam(s) may be determined, e.g., in response to a change in constraints. Accordingly, the UE may provide updated reports and recommended beams to the BS as needed. Further, other constraints, (e.g., related to available battery energy, among various possibilities) may change over time, and the UE may update beam recommendations (with or without further measurements) in response to such changes. Still further, constraints set by the network/BS may change (e.g., due to resource availability, congestion, etc.) and the UE may update beam recommendations in response.

Similarly, the UE may be configured to perform measurements and/or evaluate constraints periodically. Thus, the UE may also periodically update beam recommendations.

FIGS. 11-14—Exemplary Cases of Beam Non-Correspondence

FIGS. 11-14 illustrate exemplary cases of beam non-correspondence, according to some embodiments.

Figure 11:
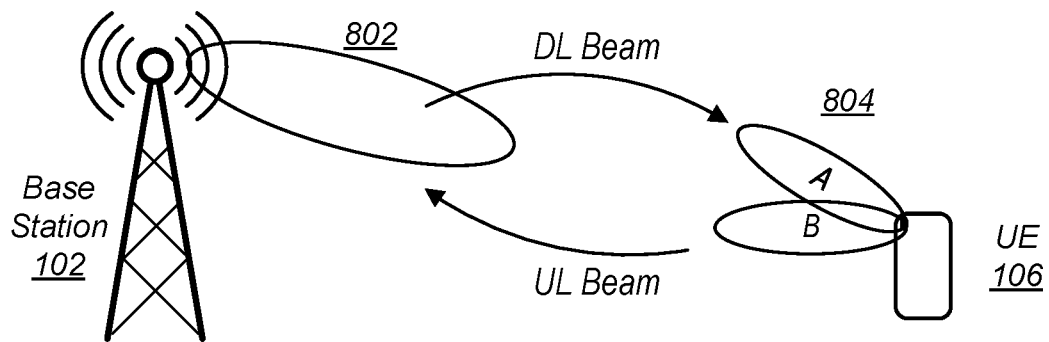
FIGS. 11-14 illustrate exemplary cases of beam non-correspondence, according to some embodiments.

FIG. 11 illustrates a BS 102 using a beam 802 for both Tx and Rx with a UE 106. The UE 106 may use beam 804A for DL and 804B for UL. Beams 804A and 804B may have different directions. Thus, the UL and DL beams may not correspond. This beam selection may be useful to achieve maximum performance (e.g., beam 804A may offer highest RSRP) while meeting other constraints (e.g., transmitting using beam 804A may not be preferred due to MPE or other considerations). In some embodiments, the UE may not report the difference in Rx and Tx beams. In other embodiments, the UE may report the difference to the BS. The UE may only make such a selection if the selection is consistent with network parameters (e.g., the difference in measurements between beams 804A and 804B is below a threshold).

Figure 12:
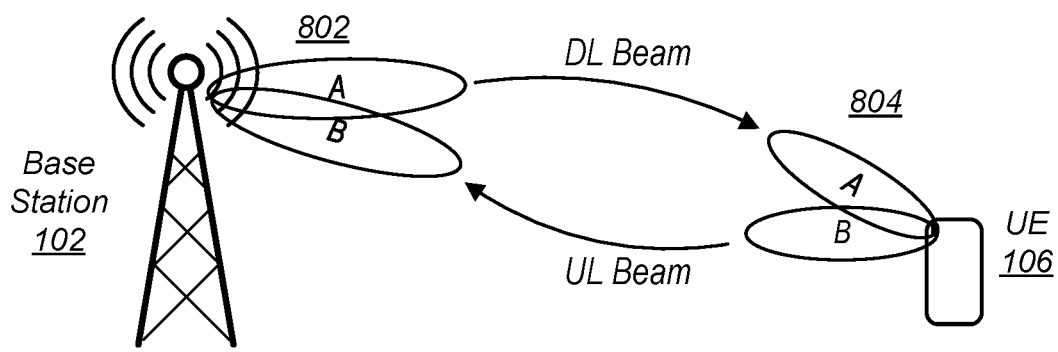

FIG. 12 illustrates a BS 102 using a beam 802A for Tx and beam 802B for Rx with a UE 106. Beams 802A and 802B may have different directions. The UE 106 may use beam 804A for DL and 804B for UL. In contrast to FIG. 11, using beam 802B to receive at the BS 102 may improve performance. Additional reporting may be used in this case, according to some embodiments.

Figure 13:
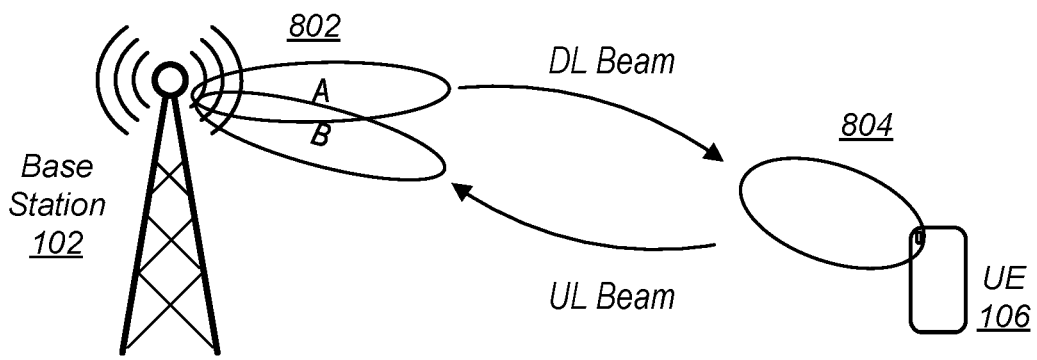

FIG. 13 illustrates a BS 102 using a beam 802A for Tx and beam 802B for Rx with a UE 106. The UE 106 may use beam 804 for UL and DL. Thus, the UL and DL beams may not correspond. This case may be controlled by the BS. The UE may have no indication (or control) that the BS uses a different beam to receive than to transmit.

Figure 14:
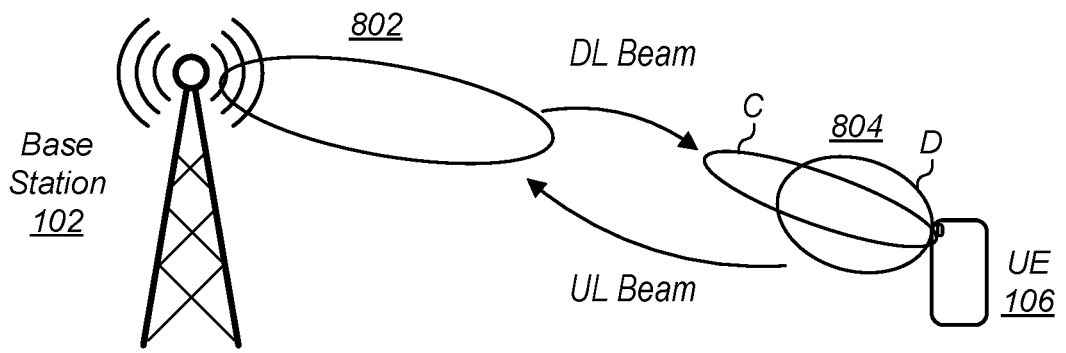

FIG. 14 illustrates a BS 102 using a beam 802 for both Tx and Rx with a UE 106. The UE 106 may use beam 804C for DL and 804A for UL. Beams 804C and 804D may have the same direction, but may have different widths. Thus, the wider beam 804D may allow a lower transmit power (e.g., due to fewer antennas) than the more focused beam 804C. The narrower beam 804C may offer higher performance. Thus, the UL and DL beams may not correspond. This beam combination may be useful to save power of the UE. In some embodiments, the UE may not report the difference in Rx and Tx beams. In other embodiments, the UE may report the difference to the BS. The UE may only make such a selection if the selection is consistent with network parameters (e.g., the difference in measurements between beams 804C and 804D is below a threshold).

Figure 15:
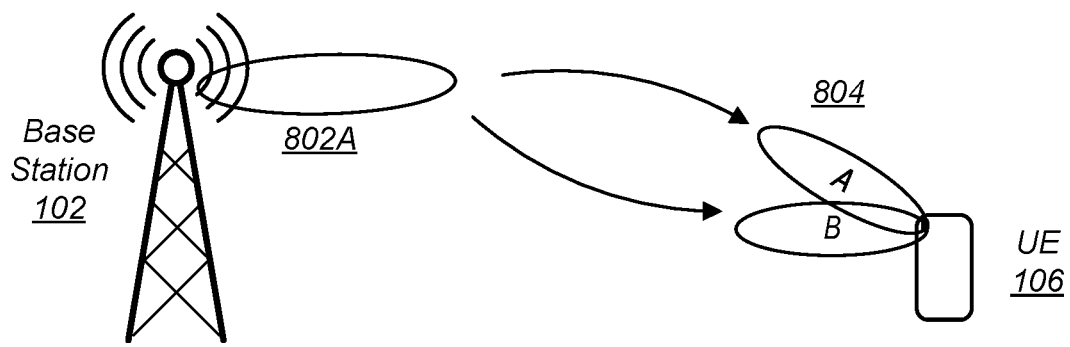
FIGS. 15-16 illustrate exemplary procedures for parallel measurement, according to some embodiments.
Figure 16:
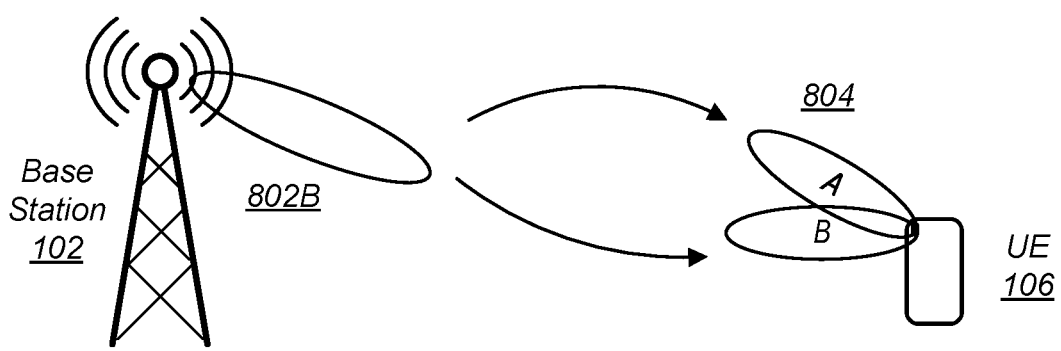

FIGS. 15-16—Procedures for Parallel Measurement

FIGS. 15-16 illustrate exemplary procedures for parallel measurement, according to some embodiments. For example, FIG. 15-16 may illustrate transmissions and measurements of a P2 procedure.

In FIG. 15, a BS 102 transmits using beam 802A to UE 106. UE 106 may be capable a of multi-beam reception. Accordingly, UE 106 may receive and take parallel measurements using both beams 804A and 804B, e.g., simultaneously.

In FIG. 16, the BS transmits using beam 802B. Again, UE 106 takes simultaneous (e.g., parallel) measurements using beams 804A and 804B.

Thus, a multi-beam reception capable UE may be able to perform measurements quickly, e.g., relative to a UE capable of receiving with only a single beam at a given time. In various embodiments, a UE 106 may or may not be multi-beam reception capable.

FIGS. 17-22—Reporting

FIGS. 17-22 illustrate exemplary reporting techniques, according to some embodiments. These figures illustrate exemplary ones of possible formats for transmitting information related to beam selection from a UE 106 to a BS 102. These reports may be transmitted in any way desired; for example, in MAC CE and/or PUSCH messages. It should be noted that the illustrated report formats are exemplary only, and that reporting may be performed using any desired format. For example, additional fields or data may be included and/or some illustrated fields may be excluded. Similarly, fields may be presented differently (e.g., in different order, using different or analogous indicators, etc.). Further, additional or different reports may be used, or no reporting may be performed, according to some embodiments.

In some embodiments, no reporting may be provided for a P3 procedure. However, FIG. 17 illustrates a reporting format that may be used with a P3 procedure, e.g., as described with respect to FIG. 10 above. In context of non-corresponding UL and DL beams, such a report that may be used to, at least in part, indicate to the BS that the reported (e.g., preferred for DL) beam is (or is not) preferred for UL, e.g., to indicate that the BS is or is not encouraged to use the reported beam for UL reception. The report may be numbered (e.g., CSI report #). The report may not include CRI, but may include other information, such as measurement results, power considerations, etc. For example, the report may include fields for one or more of RSRP, power head room (PHR), path loss, etc. One report may be transmitted for each P3 procedure; e.g., each report may correspond to a single Tx beam of the BS. The entry in the report may either be valid or invalid. A valid entry may indicate that the UE recommends this beam for UL reception. An invalid entry (e.g., with a floored/minimum RSRP and/or negative PHR, or other indication of invalidity), may indicate that the beam is not suitable for UL reception (e.g., in view of the UL Tx beam that the UE has selected to use).

FIG. 18 illustrates a reporting format that may be used with a P2 procedure, e.g., in the case of parallel measurements as described with respect to FIGS. 15-16 above. A conventional P2 report may be modified to distinguish between a UL and DL beam. For example, a one-bit indicator/flag 1802 may be added to indicate if an entry is suitable for UL, and/or to indicate which of multiple included entries is recommended for UL. As illustrated, the report may include a CSI report number, and, for each entry of any number of entries (e.g., four entries in the illustrated example) one or more CSI fields. The CSI fields may identify the resource index (e.g., SSBRI/CRI) corresponding to entries in the report, and may further include measurements for each entry. For example, in the illustrated example, RSRP #1 may correspond to SSBRI/CRI #1. The added indicator 1802 may be used to indicate which entry is recommended for UL (e.g., SSBRI/CRI #2, in the illustrated example). Note that the indicator 1802 may be formatted as desired. For example, multiple bits may be used to rank the beams by suitability for UL, etc.

FIGS. 19 and 20 illustrate exemplary separate reports for DL and UL beam selection. As shown both reports may include a report number, e.g., for DL (FIG. 19) or UL (FIG. 20). Further, each report may identify any number of beams (e.g., to be used by the BS for DL or UL, respectively). The beams may be identified by SSBRI, CRI, or other indicators. In the illustrated examples, four beams are shown in each report, but other numbers of beams are possible. RSRP and/or other measurements for each beam may be provided. The beams may be implicitly or explicitly ranked, e.g., as shown the beams may be ranked by the order in which they are presented in the report. The DL beam rankings may be based on the measurements (e.g., whether or not measurements are included in the report). The UL rankings may be based at least in part on constraints, e.g., MPE, hardware, power, etc.

In some embodiments, the UE may transmit only one report (e.g., a DL report, or a report that is applicable to both UL and DL beams) if the constraints do not limit the selection of a UL beam (e.g., if the UL and DL beams correspond). In other words, the UL report (e.g., or two separate reports) may only be transmitted if the UL and DL beams do not correspond.

FIG. 21 illustrates a report useful for differential reporting for DL and UL beam management. Such a report may be similar to CRI/RSRP reporting for DL beam management, however additional data may be included. As illustrated, the report may include a report number and identifiers for any number of beams of the BS. For each beam, the report may provide measurement information (e.g., RSRP, as illustrated but other or additional measurements may be used). Further, for each beam, the report may include a delta field. In the illustrated example, the delta may indicate a power level associated with each beam. For example, the delta may be a power backoff (e.g., or power headroom (PHR), etc.) associated with each beam. Thus, the delta may indicate the power that the UE would use to transmit a beam associated with (e.g., pointing toward) the indicated BS beam. For example, referring back to FIG. 12, beam 804B is a UE Tx beam that points toward the BS receive beam 802B. Thus, in an entry corresponding to beam 802B, the UE may report a power backoff based on constraints applicable to beam 804B. Further the report may explicitly or implicitly include rankings of the beams for UL and or DL. The DL rankings may be based on the measurements (e.g., the BS may be able to infer DL rankings based on reported RSRP). The report may implicitly indicate UL rankings based on a combination of the measurements and delta information. For example, the BS may determine a preferred UL beam (e.g., a Tx beam for the UE to use) based on the measurement and delta information. For example, if beam #n0 offers the highest RSRP, but also has a relatively high power backoff (e.g., indicating that the UE may use low transmit power with beam #n0), the BS may select beam #n1 (e.g., with the second best RSRP, but a lower backoff, thus indicating that the UL beam including beam #n1 may achieve better performance). The BS may indicate such a selection to the UE, e.g., in a later message (e.g., RRC configuration, MAC CE, PDCCH, etc.).

FIG. 22 illustrates a reporting format that may be used for reporting power level, e.g., power headroom (PHR) together with CSI/RSRP reporting. As in FIG. 21, the report may include a report number, identifiers for each beam, and RSRP (and/or other measurements) for each beam. PHR may also be provided for each beam. PHR may be useful for providing the BS (or network) information about constraints faced by the UE, or other issues relevant to beam management. The report may explicitly or implicitly indicate ranks for UL and/or DL for each of the beams. The BS may select beams based on the report, e.g., including the PHR and/or measurements.

Further Examples

In the following, exemplary embodiments are provided.

In some embodiments, a method for performing beam management may comprise: by a user equipment device (UE): establishing wireless communication with a base station; performing at least one measurement of wireless communication between the base station and the UE; determining at least one constraint; selecting a recommended uplink beam based at least in part on the at least one measurement and the at least one constraint; selecting a recommended downlink beam based at least in part on the at least one measurement; transmitting a report to the base station, wherein the report indicates at least the recommended downlink beam; and receiving an indication of a selected beam from the base station.

In some embodiments, the recommended uplink beam is different from the recommended downlink beam.

In some embodiments, the at least one constraint comprises a constraint based on Maximum Permissible Exposure (MPE).

In some embodiments, the at least one constraint comprises a constraint based on co-existence interference.

In some embodiments, the method further comprises: detecting a changed constraint; selecting a second recommended uplink beam based at least in part on the changed constraint; and transmitting a second report to the base station, wherein the second report indicates the second recommended uplink beam.

In some embodiments, the at least one constraint comprises a prohibition of at least one potential uplink beam.

In some embodiments, the at least one constraint comprises a constraint based on power saving.

In some embodiments, an apparatus for managing a user equipment device (UE), may include a processing element which may be configured to cause the UE to: communicate with a base station; perform at least one measurement; determine at least one constraint; determine an uplink beam based at least in part on the at least one constraint and the at least one measurement; and transmit a report to the base station, wherein the report indicates the uplink beam.

In some embodiments, the uplink beam and the downlink beam are non-corresponding.

In some embodiments, to perform the at least one measurement, the processing element is further configured to cause the UE to: initiate a beam selection procedure.

In some embodiments, the beam selection procedure is P3.

In some embodiments, to initiate the beam selection procedure, the processing element is further configured to cause the UE to: transmit an indication of a set of candidate beams to the base station.

In some embodiments, the report comprises a valid entry for the uplink beam.

In some embodiments, the at least one constraint comprises a delta threshold, wherein to determine the uplink beam, the processing element is further configured to cause the UE to: determine a first beam with a highest signal strength; determine, for at least a second beam, a respective difference in signal strength relative to the highest signal strength; compare, for at least the second beam, the respective difference to the delta threshold; and select, in response to the respective difference of the second beam being less than the delta threshold, the second beam as the uplink beam.

In some embodiments, the processing element is further configured to cause the UE to: recommend the first beam as a downlink beam.

In some embodiments, a user equipment device (UE) may include: at least two antennas; at least one radio coupled to the antennas; and a processing element coupled to the radio; wherein the UE is configured to: communicate with a base station; determine at least one constraint; determine a first uplink beam based at least in part on the at least one constraint; transmit a first indication of the first uplink beam to the base station; receive a message, from base station, wherein the second message indicates a second uplink beam; and transmit data to the base station using the second uplink beam.

In some embodiments, the second uplink beam is the same as the first uplink beam.

In some embodiments, the message further indicates a downlink beam, wherein the downlink beam is different from the second uplink beam, wherein the UE is further configured to receive second data from the base station using the downlink beam.

In some embodiments, the first indication comprises a report, wherein the report comprises a second indication of a power level associated with the first uplink beam.

In some embodiments, the indication comprises a one-bit flag in a report on a plurality of beams, wherein the one-bit flag indicates that the uplink beam is recommended for uplink.

Another exemplary embodiment may include a wireless device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Yet another exemplary set of embodiments may include a 5G NR network node or base station configured to perform any action or combination of actions as substantially described herein in the Detailed Description and/or Figures.

Yet another exemplary set of embodiments may include a 5G NR network node or base station that includes any component or combination of components as described herein in the Detailed Description and/or Figures as included in a mobile device.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A method, comprising:
by a user equipment device (UE):
establishing wireless communication with a base station;
requesting to initiate a beam selection procedure using a set of candidate beams, wherein requesting to initiate the beam selection procedure includes transmitting an indication of the set of candidate beams to the base station;
subsequently to said requesting and during the beam selection procedure:
receiving channel state information reference signal (CSI-RS) from the base station using at least one beam of the set of candidate beams; and
performing at least one measurement of the CSI-RS;
determining at least one transmission constraint;
selecting a recommended uplink beam from a plurality of potential uplink beams based at least in part on the at least one measurement and the at least one transmission constraint;
selecting a recommended downlink beam from a plurality of potential downlink beams based at least in part on the at least one measurement;
transmitting a report to the base station, wherein the report indicates the recommended downlink beam and the recommended uplink beam;
receiving, from the base station, an indication of a selected uplink beam and a selected downlink beam; and
communicating, with the base station, using the selected uplink beam and the selected downlink beam.

2. The method of claim 1, wherein the recommended uplink beam is different from the recommended downlink beam.

3. The method of claim 1, wherein the at least one transmission constraint comprises a constraint based on Maximum Permissible Exposure (MPE).

4. The method of claim 1, wherein the at least one transmission constraint comprises a constraint based on co-existence interference.

5. The method of claim 1, the method further comprising:
detecting a changed transmission constraint;
selecting a second recommended uplink beam based at least in part on the changed transmission constraint; and
transmitting a second report to the base station, wherein the second report indicates the second recommended uplink beam.

6. The method of claim 1, wherein the at least one transmission constraint comprises a prohibition of at least one potential uplink beam.

7. The method of claim 1, wherein the at least one transmission constraint comprises a constraint based on power saving.

8. An apparatus, comprising:
a processor configured to cause a user equipment device (UE) to:
communicate with a base station;
subsequently, request to initiate a beam selection procedure using a set of candidate beams, wherein requesting to initiate the beam selection procedure includes transmitting an indication of a set of candidate beams to the base station;
subsequently to said requesting and during the beam selection procedure:

receiving channel state information reference signal (CSI-RS) from the base station using at least one beam of the set of candidate beams; and performing at least one measurement of the CSI-RS;

determine at least one transmission constraint;

select an uplink beam of a plurality of possible uplink beams based at least in part on the at least one transmission constraint and the at least one measurement of the CSI-RS;

select a downlink beam of a plurality of possible downlink beams based at least in part on the at least one measurement of the CSI-RS; and transmit a report to the base station, wherein the report indicates the uplink beam and the downlink beam.

9. The apparatus of claim 8, wherein the processor is further configured to cause the UE to:

select a downlink beam of a plurality of possible downlink beams based at least in part on the at least one transmission constraint and the at least one measurement, wherein the uplink beam and the downlink beam are non-corresponding.

10. The apparatus of claim 8, wherein the set of candidate beams comprises transmission beams of the base station.

11. The apparatus of claim 8, wherein the beam selection procedure is P3.

12. The apparatus of claim 8, wherein the indication of the set of candidate beams comprises an index.

13. The apparatus of claim 8, wherein the report comprises a valid entry for the uplink beam.

14. The apparatus of claim 8, wherein the at least one transmission constraint comprises a delta threshold, wherein to select the uplink beam, the processor is further configured to cause the UE to:

determine a first beam with a highest signal strength;

determine, for at least a second beam, a respective difference in signal strength relative to the highest signal strength;

compare, for at least the second beam, the respective difference to the delta threshold; and select, in response to the respective difference of the second beam being less than the delta threshold, the second beam as the uplink beam.

15. The apparatus of claim 14, wherein the processor is further configured to cause the UE to:

recommend the first beam as a downlink beam.

16. A user equipment device (UE), comprising:

at least two antennas;

at least one radio coupled to the antennas; and a processor coupled to the radio;

wherein the UE is configured to:

communicate with a base station;

subsequently, request to initiate a beam selection procedure using a set of candidate beams, wherein requesting to initiate the beam selection procedure includes transmitting an indication of a set of candidate beams to the base station;

subsequently to said requesting and during the beam selection procedure:

receive channel state information reference signal (CSI-RS) from the base station using at least one beam of the set of candidate beams; and perform at least one measurement of the CSI-RS;

determine at least one beamforming constraint;

select a first uplink beam from a plurality of possible uplink beams based at least in part on the at least one beamforming constraint and the at least one measurement of the CSI-RS;

select a first downlink beam from a plurality of possible downlink beams based at least in part on the at least one measurement; and transmit a first indication of the first uplink beam and a second indication of the first downlink beam to the base station.

17. The UE of claim 16, wherein the set of candidate beams comprises transmission beams of the base station.

18. The UE of claim 16, wherein the indication of the set of candidate beams comprises an index.

19. The UE of claim 16, wherein the first indication comprises a report, wherein the report comprises a third indication of a power level associated with the first uplink beam.

20. The UE of claim 16, wherein the first indication comprises a one-bit flag in a report on a plurality of beams, wherein the one-bit flag indicates that the first uplink beam is recommended for uplink.

* * * * *